United States Patent [19]

Schiessl et al.

[11] 3,983,048

[45] *Sept. 28, 1976

[54] COMPOSITION FOR ACCELERATING OXYGEN REMOVAL COMPRISED OF A MIXTURE OF AQUEOUS HYDRAZINE AND AN ARYL AMINE COMPOUND

[75] Inventors: Henry W. Schiessl, Northford; John D. Kaufman, Prospect; David A. Csejka, Orange, all of Conn.

[73] Assignee: Olin Corporation, New Haven, Conn.

[ * ] Notice: The portion of the term of this patent subsequent to Oct. 22, 1991, has been disclaimed.

[22] Filed: Dec. 10, 1973

[21] Appl. No.: 423,042

Related U.S. Application Data

[63] Continuation-in-part of Ser. No. 318,286, Dec. 26, 1972, abandoned.

[52] U.S. Cl. .............................. 252/178; 21/2.7 R; 252/181; 252/188; 252/389 R
[51] Int. Cl.² .......................................... C02B 1/18
[58] Field of Search .............. 252/389 R, 188, 181, 252/178; 21/2.7 R, 2.5

[56] References Cited

UNITED STATES PATENTS

| 3,347,791 | 10/1967 | Thompson | 252/389 A |
| 3,843,547 | 10/1974 | Kaufman et al. | 21/2.7 R |

FOREIGN PATENTS OR APPLICATIONS

| 701,400 | 1/1965 | Canada | 252/178 |

Primary Examiner—Mayer Weinblatt
Assistant Examiner—Edith R. Buffalow
Attorney, Agent, or Firm—James B. Haglind; Donald F. Clements; Thomas P. O'Day

[57] ABSTRACT

The rapid removal of dissolved oxygen from aqueous solutions is accomplished by the use of a composition comprised of a mixture of an aqueous solution of hydrazine and a catalytic proportion of an aryl amine compound. The compositions of this invention are particularly useful in the removal of dissolved oxygen from aqueous solutions such as boiler water, thereby inhibiting corrosion of the metal surfaces of the boiler.

9 Claims, No Drawings

COMPOSITION FOR ACCELERATING OXYGEN REMOVAL COMPRISED OF A MIXTURE OF AQUEOUS HYDRAZINE AND AN ARYL AMINE COMPOUND

This application is a continuation-in-part of copending application Ser. No. 318,286, filed December 26, 1972, now abandoned.

This invention relates to compositions useful for the rapid removal of dissolved oxygen from liquids or gases.

It is known to use hydrazine compounds for the removal of dissolved or chemically uncombined oxygen from gases and liquids to inhibit or to reduce corrosion of metal surfaces. Commercially important is the use of hydrazine compounds in the treatment of water used in boilers and hot-water heating systems to inhibit or reduce corrosion. The general explanation given for the effect of the hydrazine compound in these applications is that it combines with oxygen present or dissolved in the material being treated according to the equation:

The rate of reaction of a hydrazine compound with oxygen at ambient or low temperatures, for example, below 60°C., is slow. It has therefore been proposed to add oxygen removal acceleration agents to increase the rate at which oxygen combines with the hydrazine compound at lower temperatures. U.S. Pat. No. 3,645,896, issued on Feb. 29, 1972, to A. L. Larsen, adds an imidazoline compound to hydrazine for oxygen removal in water-injection type oil wells. U.S. Pat. No. 3,551,349, issued on Dec. 29, 1970, to H. Kallfass, adds water soluble quinone compounds to aqueous solutions of hydrazine as activators in removing oxygen from water solutions, and U.S. Pat. No. 3,728,281, issued on Apr. 17, 1973 to C. E. Marks et al, incorporates pyrazolidones and/or mono-or polyamino phenols as oxygen removal accelerators from water solutions.

It is a primary object of the present invention to provide a composition for and a method of rapidly removing oxygen from oxygen-containing materials.

It is a further object of this invention to provide a novel composition for inhibiting corrosion or degradation of metals by rapidly removing oxygen from oxygen-containing materials in contact with said metals.

Another object of the present invention is to provide a novel composition for the rapid removal of oxygen from aqueous solutions in contact with metal surfaces.

Still another object of the invention is to provide a method of rapidly removing oxygen from aqueous solutions in contact with metal surfaces.

These and other objects of the invention will be apparent from the following detailed description of the invention.

It has now been discovered that the aforesaid objects are accomplished by admixing an aqueous hydrazine solution with a catalytic proportion of an aryl amine compound to form a novel composition capable of rapidly removing oxygen from oxygen-containing materials. When this novel composition is further admixed in an effective proportion with an oxygen-containing material, a rapid removal of oxygen therefrom is effected, and corrosion of metal surfaces in contact with the thus treated oxygen-containing material is inhibited.

More in detail the aryl amine compound employed in the novel composition of the present invention is represented by the formula

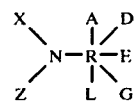

a. wherein R is an aryl group containing from about 6 to about 14 carbon atoms;
b. wherein A, D, E, G, and L are each a substituent individually selected from the group consisting of:
  1. amine
  2. hydrogen
  3. sulfonic acid
  4. alkali metal salts of sulfonic acid
  5. carboxylic acid
  6. alkali metal salts of carboxylic acid
  7. sulfuric acid
  8. alkali metal salts of sulfuric acid
  9. alkyl having from 1 to 4 carbon atoms, and
  10. haloalkyl having from 1 to 4 carbon atoms wherein at least one of said substituents is other than hydrogen;
c. wherein X and Z are individually selected from the group consisting of hydrogen and alkyl having from 1 to 4 carbon atoms, and
d. wherein N is nitrogen.

Suitable salts of alkali metals include salts of sodium, potassium and lithium. Suitable halogen substituents include chlorine, bromine, fluorine and iodine.

Typical aryl amines represented by Formula I include:
o-phenylene diamine
p-phenylene diamine
2,3-toluene diamine
2,6-toluene diamine
2,4-toluene diamine
m-aminobenzotrifluoride
3,5-diaminobenzoic acid sulfate
α-chlorotoluidine
p-aminobenzene sulfonic acid, sodium salt
p-aminobenzoic acid, sodium salt In a preferred embodiment of the invention, the aryl amine compound is represented by the following formula

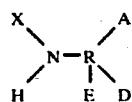

wherein R is an aryl group containing from about 6 to about 10 carbon atoms; wherein A, D, E, N, and X are each a substituent individually selected from the group consisting of:
1. amine
2. hydrogen
3. sulfonic acid
4. alkyl having 1 to 4 carbon atoms
5. haloalkyl having 1 to 4 carbon atoms wherein at least one of said substituents is other than hydrogen. In haloalkyl groups, fluorine and chlorine are preferred halogen atoms and the alkyl group contains from 1 to 4 carbon atoms.

Typical aryl amines represented by Formula II include:

o-phenylene diamine
p-phenylene diamine
2,3-toluene diamine
2,6-toluene diamine
2,4-toluene diamine
m-aminobenzotrifluoride In addition to the compounds of formulas I and II above, other compounds effective in the acceleration of oxygen removal from water solutions by hydrazine include aryl amine compounds having from about 10 to about 14 carbon atoms and substituted by one or more hydroxyl groups in addition to substituents A, D, E, G, and L as defined above. Suitable examples include:

1-amino-2-naphthol-4-sulfonic acid
5-(N,N-dimethylamino)naphthol
5-amino-4-hydroxy-2-naphthalene sulfonic acid
4-amino-5-hydroxy-1,7-naphthalene disulfonic acid
3,7-diamino-4,8-dihydroxy-1,5-anthracenedisulfonic acid While the exact mechanism through which the removal of oxygen by hydrazine is accelerated by the aryl amine compound is not clearly understood, it is believed that the aryl amine compound truly acts as a catalyst. A catalytic proportion is the amount of aryl amine compound capable of accelerating the removal of oxygen. In the novel composition of this invention, a catalytic proportion of aryl amine is generally equivalent to a weight ratio of aryl amine compound to the hydrazine present of from about 1:1500 to about 1:15, and preferably from about 1:150 to about 1:50 but greater or lesser ratios of aryl amine to hydrazine may be employed, if desired.

Generally, the aqueous solution of hydrazine used has a concentration of about 5 to about 65 percent by weight of hydrazine and preferably from about 15 to about 50 percent by weight of hydrazine. With an aqueous solution containing about 35 percent by weight of hydrazine, from about 0.23 to about 0.70 percent by weight of aryl amine compound is employed to accelerate oxygen removal.

The novel composition is used in an effective proportion in the novel method of this invention to accelerate oxygen removal from oxygen-containing materials in either liquid or gaseous form. In the novel method of this invention, an effective proportion of the novel composition is admixed with the oxygen-containing material by any suitable mixing technique such as mechanical agitation or the like in order to maintain the oxygen concentration at a low level. For example, at room temperature and pressure, a boiler water solution saturated with oxygen contains about 8 to 9 parts of oxygen per million. This boiler water solution may be treated by the novel method of this invention to reduce the oxygen concentration to a range from about 1 to 10 parts per billion at operating conditions.

Generally when the oxygen-containing material to be treated with the novel composition and novel method of this invention is a liquid, a sufficient proportion of the above-described novel composition is added to the liquid to maintain a hydrazine concentration in the liquid of between about 0.05 and about 150, and preferably between about 0.1 and about 50 parts of hydrazine per million parts of liquid. Similarly, sufficient novel composition is admixed with the liquid to maintain the concentration of aryl amine in a range from about 0.00033 to about 10 and preferably from about 0.00067 to about 1 part of aryl amine per million parts of liquid. Greater or lesser proportions may be employed if desired. These proportions have been found to be effective in the treatment of boiler water in a boiler operated at pressure up to 400 atmospheres, and at temperatures ranging from about 0 to about 600°C. However, the same proportions may be used in refrigeration systems at temperatures of about 25°C. down to about 0°C. or less.

The novel composition and method of the present invention are used, for example, not only to rapidly accelerate the removal of oxygen from liquids such as water solutions used in boilers but also in hot water systems, oil wells using water injection systems, solutions of glycol ethers, heterocyclic oxygen-containing compounds such as furan or sodium dibutyl dithiocarbamate, and the like. Effective control of the oxygen content of these liquids is obtained by admixing the novel composition of this invention with the oxygen-containing solution in the proportions described above. Since hydrazine is consumed during oxygen removal, the concentration of the treated liquid should be determined periodically and additional novel composition should be added to the treated liquid in order to maintain the concentration of hydrazine and aryl amine in the liquid within the above-defined proportions.

When the oxygen-containing material being treated is a gas such as ammonia, hydrogen or other gases inert to hydrazine, oxygen reduction and/or removal from the gas can be obtained by scrubbing the oxygen-containing gas in the novel composition of this invention having hydrazine and aryl amine concentrations within the above-identified ranges. Scrubbing of the gas can be effected in a suitable scrubber, preferably where the oxygen-containing gas in finely divided form is dispersed in the hydrazine solution.

Removal of oxygen from liquid and gas using the novel method and novel composition of this invention provides oxygen-free liquids and gas which may be contacted with metal surfaces in boilers, ducts, pipes and the like, without corrosion of these metal surfaces caused by free oxygen being present in the liquids and gas.

While the compositions of the present invention have been described in terms of the addition of an aryl amine compound to an aqueous solution of hydrazine, it will be readily understood by those skilled in the art that other amine compounds can be employed in the same or similar proportions. For example, alkyl amines containing between 1 and 6 carbon atoms having substituents similar to those described above for the aryl amine compounds may be used to replace part or all of the aryl amine compounds. Typical examples of suitable alkyl amines include:

methyl amine
butyl amine
ethanol amine
ethylene diamine
dipropylene triamine
aminoacetic acid, sodium salt
2-amino-3-hydroxypropionic acid
3-chloromethyl-2-aminopropionic acid
2-aminoethane sulfonic acid
1-aminopropane-2-sulfonic acid
n-butyl dichloroamine
2-bromoethylamine
propylamine sulfate Although the invention has been described using aqueous hydrazine solution as a component of the novel composition, those skilled in the art will recognize that aqueous solutions of inorganic and organic hydrazine compounds can be employed to replace part or all of the aqueous hydrazine solution in the proportions described above. Typical examples of suitable inorganic hydrazine compounds include:

hydrazine phosphate
hydrazine mono- and dihydrochloride
hydrazine mono- and dihydrobromide
mono- and dihydrazine sulfate
hydrazine sulfite.

Examples of suitable organic hydrazine compounds include lower mono- and dialkylhydrazines such as methyl hydrazine
ethyl hydrazine
propyl hydrazine
butyl hydrazine
1,1-dimethyl hydrazine
1,1-dibutyl hydrazine
2-hydroxyethyl hydrazine In addition, salts such as phosphates or sulfates of the above organic hydrazine compounds may be used.

The following examples are presented to further illustrate the invention without any intention of being limited thereby. All parts and percentages are by weight unless otherwise specified.

EXAMPLES 1–6

Six aryl amines of the type described above and as identified below in the table as Examples 1–6, respectively, were each admixed with aqueous hydrazine solution and then admixed with portions of an aqueous solution saturated with free oxygen in order to demonstrate the effectiveness of the novel composition and method of this invention. In each example, one part of an aqueous solution containing 1500 ppm of hydrazine and 30 ppm of the selected aryl amine compound were admixed with 9 parts of water saturated with oxygen and buffered to a pH of 10 to give an aqueous solution containing 150 ppm of hydrazine and 3 ppm of the selected aryl amine at a temperature of 25°C. Oxygen removal was determined by a polarographic method over a period of about ten minutes. The results for the percent of oxygen removed after five and after ten minutes in Examples 1–6 are given in Table 1.

For purposes of comparison of the procedure of Examples 1–6 was repeated except that only hydrazine, without an aryl amine compound, was added to the aqueous solution saturated with oxygen. The percent oxygen removed was determined after five and ten minutes and the results are presented below in Table 1 under Example C-1. The aqueous solution containing 1500 ppm of hydrazine and 30 ppm of the aryl amine compound was prepared as follows: To an aqueous hydrazine solution containing 35 percent by weight of hydrazine, sufficient aryl amine compound was added to provide an aryl amine concentration of 0.70 percent by weight of solution. This solution was diluted with 1000 mls. of deoxygenated water.

Table 1

Percent Oxygen Removal From Aqueous Solutions at 25°C. and pH 10

| Ex. | Aryl Amine Compound (3 ppm in 150 ppm aq. $N_2H_4$) | After 5 Minutes | After 10 Minutes |
|---|---|---|---|
| 1 | 2,4-toluene diamine | 55 | 92 |
| 2 | 2,6-toluene diamine | 75 | 95 |
| 3 | m-aminobenzotrifluoride | 62 | 95 |
| 4 | 1-amino-2-naphthol-4-sulfonic acid | 65 | 95 |
| 5 | o-phenylene diamine | 44 | 82 |
| 6 | p-phenylene diamine | 84 | 95° |
| C-1 | Hydrazine (without aryl amine compound) | 25 | 50 |

These data show that the novel compositions of this invention comprised of a mixture of aqueous hydrazine and the specified aryl amines in the proportions specified, removed a significant proportion of the oxygen (greater than 76 percent) from the water after contact for 10 minutes. In view of this effective removal of oxygen from the water, the resulting treated water could be contacted with metal surfaces for extended periods without causing substantial corrosion.

What is claimed is:

1. A composition for the removal of dissolved oxygen from liquids or gases comprised of a mixture of an aqueous solution of hydrazine and a catalytic proportion of an aryl amine compound having the formula

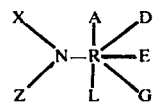

a. wherein R is an aryl group containing from about 6 to about 14 carbon atoms;
b. wherein A, D, E, G, and L are individually selected from the group consisting of
   1. amine
   2. hydrogen
   3. sulfonic acid
   4. alkali metal salts of sulfonic acid
   5. carboxylic acid
   6. alkali metal salts of carboxylic acid
   7. sulfuric acid
   8. alkali metal salts of sulfuric acid
   9. alkyl having from 1 to 4 carbon atoms, and
   10. haloalkyl having from 1 to 4 carbon atoms
wherein at least one of said substituents is other than hydrogen;
c. wherein X and Z are individually selected from the group consisting of hydrogen and alkyl having from 1 to 4 carbon atoms, and
d. wherein N is nitrogen.

2. The composition of claim 1 wherein said catalytic proportion is equivalent to a weight ratio of said aryl amine compound to said hydrazine compound of from about 1:1500 to about 1:15.

3. The composition of claim 2 wherein said catalytic proportion is equivalent to a weight ratio of said aryl amine compound to said hydrazine compound of from about 1:150 to about 1:50.

4. The composition of claim 3 wherein said aryl amine compound is toluene diamine.

5. The composition of claim 3 wherein said aryl amine compound is phenylene diamine.

6. The composition of claim 3 wherein said aryl amine compound is aminobenzotrifluoride.

7. The composition of claim 2 wherein the concentration of said hydrazine in said aqueous solution is from about 5 to about 65 percent by weight.

8. The composition of claim 3 wherein the concentration of said hydrazine in said aqueous solution is from about 15 to about 50 percent by weight.

9. The composition of claim 1 wherein said aryl amine compound has the formula

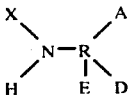

wherein A, D and E are each a substituent individually selected from the group consisting of:
1. amine
2. hydrogen
3. sulfonic acid
4. alkyl having 1 to 4 carbon atoms
5. haloalkyl having 1 to 4 carbon atoms and wherein at least one of said substituents is other than hydrogen.

* * * * *